US011509233B1

(12) United States Patent
Keister et al.

(10) Patent No.: US 11,509,233 B1
(45) Date of Patent: Nov. 22, 2022

(54) SURGE VOLTAGE PROTECTION FOR A POWER CONVERSION SYSTEM

(71) Applicant: Resilient Power Systems, Inc., Athens, GA (US)

(72) Inventors: Josh Keister, Athens, GA (US); Lyle T. Keister, Athens, GA (US); Mehdi Abolhassani, Houston, TX (US)

(73) Assignee: Resilient Power Systems, Inc., Athens, GA (US)

( * ) Notice: Subject to any disclaimer, the term of this patent is extended or adjusted under 35 U.S.C. 154(b) by 0 days.

(21) Appl. No.: 17/728,273

(22) Filed: Apr. 25, 2022

(51) Int. Cl.
| | |
|---|---|
| *H02M 5/458* | (2006.01) |
| *H02M 1/34* | (2007.01) |
| *H02M 1/00* | (2006.01) |
| *H02J 3/38* | (2006.01) |
| *H02M 3/335* | (2006.01) |
| *H02M 7/49* | (2007.01) |
| *B60L 53/30* | (2019.01) |
| *B60L 55/00* | (2019.01) |
| *H02J 7/35* | (2006.01) |

(52) U.S. Cl.
CPC ........... *H02M 5/4585* (2013.01); *B60L 53/30* (2019.02); *B60L 55/00* (2019.02); *H02J 3/381* (2013.01); *H02J 7/35* (2013.01); *H02M 1/0077* (2021.05); *H02M 1/34* (2013.01); *H02M 3/33584* (2013.01); *H02M 7/49* (2013.01)

(58) Field of Classification Search
CPC .... H02M 5/4585; H02M 1/0077; H02M 1/34; H02M 3/33584; H02M 7/49; B60L 53/30; B60L 55/00; H02J 3/381; H02J 7/35
See application file for complete search history.

(56) References Cited

U.S. PATENT DOCUMENTS

| | | | | |
|---|---|---|---|---|
| 5,528,113 | A * | 6/1996 | Boys | B60L 53/126 |
| | | | | 318/16 |
| 5,642,270 | A | 6/1997 | Green et al. | |
| 7,256,516 | B2 * | 8/2007 | Buchanan | B60L 53/67 |
| | | | | 307/62 |
| 9,780,682 | B2 * | 10/2017 | Keister | H02M 5/4585 |
| 9,906,155 | B2 | 2/2018 | Keister et al. | |
| 10,131,239 | B2 * | 11/2018 | Herke | B60L 53/14 |
| 10,608,545 | B2 | 3/2020 | Keister et al. | |
| 10,696,183 | B2 | 6/2020 | Roggendorf et al. | |
| 10,811,988 | B2 | 10/2020 | Keister et al. | |
| 10,958,098 | B1 * | 3/2021 | Li | H02J 7/34 |
| 11,070,045 | B1 * | 7/2021 | Li | H02H 3/207 |
| 11,264,790 | B2 * | 3/2022 | Cairoli | H02H 3/05 |

(Continued)

OTHER PUBLICATIONS

ChargePoint, Inc., CT 4000 Family, ChargePoint Level 2 Commercial Charging Stations, 2021, pp. 1-4.

(Continued)

*Primary Examiner* — Yusef A Ahmed
(74) *Attorney, Agent, or Firm* — Trop, Pruner & Hu, P.C.

(57) ABSTRACT

In one embodiment, an apparatus includes a surge voltage blocker circuit to couple between a distribution grid network and a grid-side power converter of a power conversion system. The surge voltage blocker circuit may include a plurality of series-coupled AC switch circuits, each including: a bidirectional switch formed of a first power transistor and a second power transistor; and a transient voltage suppression device coupled in parallel with the bidirectional switch.

17 Claims, 14 Drawing Sheets

(56) References Cited

U.S. PATENT DOCUMENTS

| | | | | |
|---|---|---|---|---|
| 11,292,352 B1* | 4/2022 | Keister | | H02M 1/0077 |
| 11,370,314 B1* | 6/2022 | Keister | | B60L 53/16 |
| 2002/0140403 A1* | 10/2002 | Reddy | | H02J 9/062 |
| | | | | 320/162 |
| 2005/0018454 A1* | 1/2005 | Deng | | H02J 3/383 |
| | | | | 363/49 |
| 2005/0105306 A1* | 5/2005 | Deng | | H02M 5/4585 |
| | | | | 363/37 |
| 2008/0198637 A1* | 8/2008 | Meysenc | | H02M 7/219 |
| | | | | 363/67 |
| 2011/0181128 A1* | 7/2011 | Perreault | | H02M 7/797 |
| | | | | 307/151 |
| 2011/0273917 A1 | 11/2011 | Maitra et al. | | |
| 2013/0308346 A1* | 11/2013 | Divan | | A63B 21/22 |
| | | | | 363/21.01 |
| 2014/0177293 A1* | 6/2014 | Eckhardt | | H02M 5/12 |
| | | | | 363/37 |
| 2015/0115891 A1* | 4/2015 | Sung | | B60L 53/11 |
| | | | | 320/109 |
| 2016/0322809 A1* | 11/2016 | Wang | | H03K 17/165 |
| 2017/0005565 A1* | 1/2017 | Bai | | H02M 1/4258 |
| 2017/0190434 A1* | 7/2017 | Dong | | H02M 7/797 |
| 2018/0109193 A1* | 4/2018 | Hirota | | H02M 7/757 |
| 2018/0166881 A1* | 6/2018 | Suryanarayana | | H02J 3/383 |
| 2018/0269782 A1* | 9/2018 | Mondal | | H02M 3/33584 |
| 2018/0278168 A1* | 9/2018 | Brown | | H02J 7/022 |
| 2018/0339601 A1 | 11/2018 | Kruszelnicki | | |
| 2019/0123549 A1* | 4/2019 | Rodrigues | | G06F 1/266 |
| 2019/0334340 A1* | 10/2019 | Niehoff | | H02H 7/268 |
| 2019/0341213 A1* | 11/2019 | Kouroussis | | H02H 3/167 |
| 2020/0211792 A1* | 7/2020 | Manahan | | H01H 71/10 |
| 2020/0211803 A1* | 7/2020 | Manahan | | H01H 9/168 |
| 2020/0313443 A1 | 10/2020 | ElMenshawy et al. | | |
| 2021/0075419 A1* | 3/2021 | Manjrekar | | H03K 17/56 |
| 2022/0045506 A1* | 2/2022 | Wang | | H01H 33/596 |
| 2022/0085600 A1* | 3/2022 | Qi | | H02H 9/02 |
| 2022/0190582 A1* | 6/2022 | Strassel | | H01H 9/542 |

OTHER PUBLICATIONS

TESLA; Supercharging Tesla, 2021, pp. 1-7.

Andrew R. Hyde, Areva; Advanced Power Converters for Universal and Flexible Power Management in Future Electricity Networks, Project No. 019794, Project Acronym: UNIFLEX-PM; Nov. 30, 2009, pp. 1-21.

Mehdi Abolhassani et al., U.S. Appl. No. 17/393,481, filed Aug. 4, 2021, entitled "Configurable Power Module for AC and DC Applications".

Josh Keister et al., U.S. Appl. No. 17/565,868, filed Dec. 30, 2021, entitled "Insulation System For Reducing Partial Discharge In Medium Voltage Power Converter".

* cited by examiner

SURGE VOLTAGE PROTECTION FOR A POWER CONVERSION SYSTEM

BACKGROUND

Power conversion systems such as solid-state transformers (SSTs), electric vehicle (EV) chargers, photovoltaic/energy storage converters, and inverter-based distributed generators are state-of-the-art devices at grid interfaces of power distribution systems. Compared to line-frequency transformers (LFTs), these systems may utilize high frequency transformers working at tens of kilohertz (kHz) of frequency for galvanic isolation, leading to substantial reductions in total volume and mass as compared to their conventional counterparts. Moreover, these conversion systems have advantages over LFT's in terms of power flow control, fault current limitation, and voltage sag compensation.

Despite the promising features of transformer-less grid-connected power conversion systems, there are currently several protection challenges that have hindered their widespread adoption. Besides their internal high frequency transformers, these conversion systems are built based upon comparatively sensitive semiconductor devices, which can be impacted by lightning-induced overvoltage and overcurrent transients. These reliability issues become predominant in grid-connected power conversion systems since medium-voltage sides are directly exposed to grid-originated disturbances. In conventional approaches, the hazards of grid-originated disturbances to the converters are decreased by LFTs that are typically protected by surge arrestor or metal-oxide varistors (MOVs) to reduce their failure rates according to insulation requirements. However such techniques may not protect grid-connected power conversion systems against overvoltage surges, especially when insulation strength is lower than MOV protective levels.

SUMMARY OF INVENTION

In one aspect, an apparatus includes a surge voltage blocker circuit to couple between a distribution grid network and a grid-side power converter of a power conversion system. The surge voltage blocker circuit may include a plurality of series-coupled AC switch circuits, where each of the plurality of series-coupled AC switch circuits comprises: a bidirectional switch formed of a first power transistor and a second power transistor, the first power transistor having a first terminal coupled to a first terminal of the second power transistor; and a transient voltage suppression device coupled in parallel with the bidirectional switch. The surge voltage blocker circuit may provide lightning protection to the grid-side power converter, where the grid-side power converter is coupled to the distribution grid network without an intervening low frequency transformer.

In an example, at least some of the plurality of series-coupled AC switch circuits further comprise a snubber circuit in parallel with the bidirectional switch. At least some of the plurality of series-coupled AC switch circuits further comprise a first snubber circuit in parallel with the first power transistor and a second snubber circuit in parallel with the second power transistor.

In response to a voltage surge at an input of the apparatus, the transient voltage suppression device is to pass at least a portion of a surge current to the power conversion system, where the surge current is to charge a DC bus of the power conversion system.

In an example, the apparatus further comprises a controller coupled to the surge voltage blocker circuit, where the controller is to control gate circuitry of the bidirectional switch of the plurality of series-coupled AC switch circuits. In response to at least one of a voltage surge at an input of the apparatus or a detection of an error in the power conversion system, the controller is to disable the bidirectional switch of at least some of the plurality of series-coupled AC switches. The controller may be configured to control switch circuitry of the grid-side power converter to cause a DC bus of the grid-side power converter to be charged in response to the voltage surge. In response to a voltage of the DC bus that exceeds a threshold, the controller is to control the switch circuitry to cause the surge current to bypass the DC bus and flow to a ground node.

In an example, the apparatus further comprises: a first voltage sensor coupled to an input of the surge voltage blocker circuit; and a second voltage sensor coupled to an output of the surge voltage blocker circuit. The first voltage sensor is to provide a sensed grid-side voltage to the controller, and the second voltage sensor is to provide a sensed converter-side voltage to the controller. The controller may be configured to control the surge voltage blocker circuit based at least in part on at least one of the sensed grid-side voltage or the sensed converter-side voltage.

In an example, the apparatus further comprises a reactor coupled between the distribution grid network and the surge voltage blocker circuit. The apparatus also may include a neutral inductor coupled between a neutral node and a ground node, where the grid-side power converter is coupled to the neutral node.

In another aspect, a method includes: in response to detecting that a voltage at a grid-side input of an EV charger exceeds a first threshold, disabling a plurality of switches of a solid state circuit breaker, to cause a surge current to flow through a plurality of transient voltage suppression devices of the solid state circuit breaker; controlling a grid-side power converter of the EV charger to cause the surge current to charge a DC bus of the grid-side power converter; and in response to detecting that the voltage of the grid-side input has fallen below the first threshold, enabling the plurality of switches of the solid state circuit breaker and controlling the grid-side power converter to be in a normal operation mode.

In an example, the method further comprises in response to detecting that a voltage of the DC bus exceeds a second threshold, controlling the grid-side power converter to enter a zero state to cause the surge current to bypass the DC bus. The method also may include: controlling a first switch and a third switch of the grid-side power converter to cause the surge current to flow through the DC bus, where a first diode is coupled in antiparallel with the first switch and a third diode is coupled in antiparallel with the third switch; and controlling the first switch and a second switch of the grid-side power converter to cause the surge current to bypass the DC bus. The plurality of switches of the solid state circuit breaker may be controlled to be closed in the normal operation mode.

In an example, the method may further include disabling at least one of the grid-side power converter and a secondary-side power converter of the EV charger in response to the detection of the voltage exceeding the first threshold, the secondary-side power converter coupled between a high frequency transformer and one or more EV charging dispensers, the grid-side power converter coupled between the solid state circuit breaker and the high frequency transformer.

In yet another aspect, an EV charging system comprises a circuit coupled between a distribution grid network and a plurality of grid-side converters. The circuit may include a plurality of series-coupled AC switch circuits, where each of the plurality of series-coupled AC switch circuits comprises: a bidirectional switch formed of a first power transistor and a second power transistor, the first power transistor having a first terminal coupled to a first terminal of the second power transistor; and a transient voltage suppression device coupled in parallel with the bidirectional switch, where the plurality of grid-side power converters are coupled to the distribution grid network without an intervening low frequency transformer. The EV charging system may also include the plurality of grid-side converters to receive grid power at a grid voltage and convert the grid voltage to a plurality of DC voltages and a plurality of high frequency converters to convert the plurality of DC voltages to a plurality of first high frequency AC voltages. In addition, the EV charging system includes a high frequency transformer having: a plurality of primary windings each coupled to one of the plurality of high frequency converters to receive a corresponding one of the plurality of first high frequency AC voltages; and a plurality of secondary windings each to output one of a plurality of second high frequency AC voltages. The EV charging system may also include a plurality of port rectifiers coupled to the plurality of secondary windings, each of the plurality of port rectifiers comprising an AC-DC converter to receive one of the plurality of second high frequency AC voltages and convert the one second high frequency AC voltage to a DC voltage, where at least some of the plurality of port rectifiers are coupled together to provide at least one of a charging current or a charging voltage to at least one dispenser, where the at least one dispenser is to provide the at least one of the charging current or the charging voltage to at least one EV.

In an example, at least some of the plurality of series-coupled AC switch circuits further comprise at least one snubber circuit in parallel with the bidirectional switch. In response to a voltage surge at an input of the circuit, the transient voltage suppression device is to pass at least a portion of a surge current to the plurality of grid-side converters, where the surge current is to charge a DC bus of the plurality of grid-side converters.

In an example, the EV charging system may further include a controller coupled to the circuit, where in response to at least one of a voltage surge at an input of the circuit or a detection of an error in the EV charging system, the controller is to disable the bidirectional switch of at least some of the plurality of series-coupled AC switches.

DETAILED DESCRIPTION

In various embodiments, a grid-connected power conversion system may directly connect to a distribution grid network directly without interfering LFT's. While such a system can benefit from reduced size and cost, there are concerns such as insufficient protection from lightning strikes or other power surges. In embodiments, a power conversion system that directly connects to a distribution grid network may include line reactors, a solid-state circuit breaker (or other blocker/disconnect circuitry), multiple cascaded power stages, one or more high frequency transformers, and secondary or low voltage side power converters. The solid-state circuit breaker may be formed of multiple low voltage AC switches (e.g., bidirectional power switches) that are connected in series. These AC switches may be implemented as four quadrant switches configured to conduct positive or negative ON-state current and block positive or negative OFF-state voltage.

Figure 1:
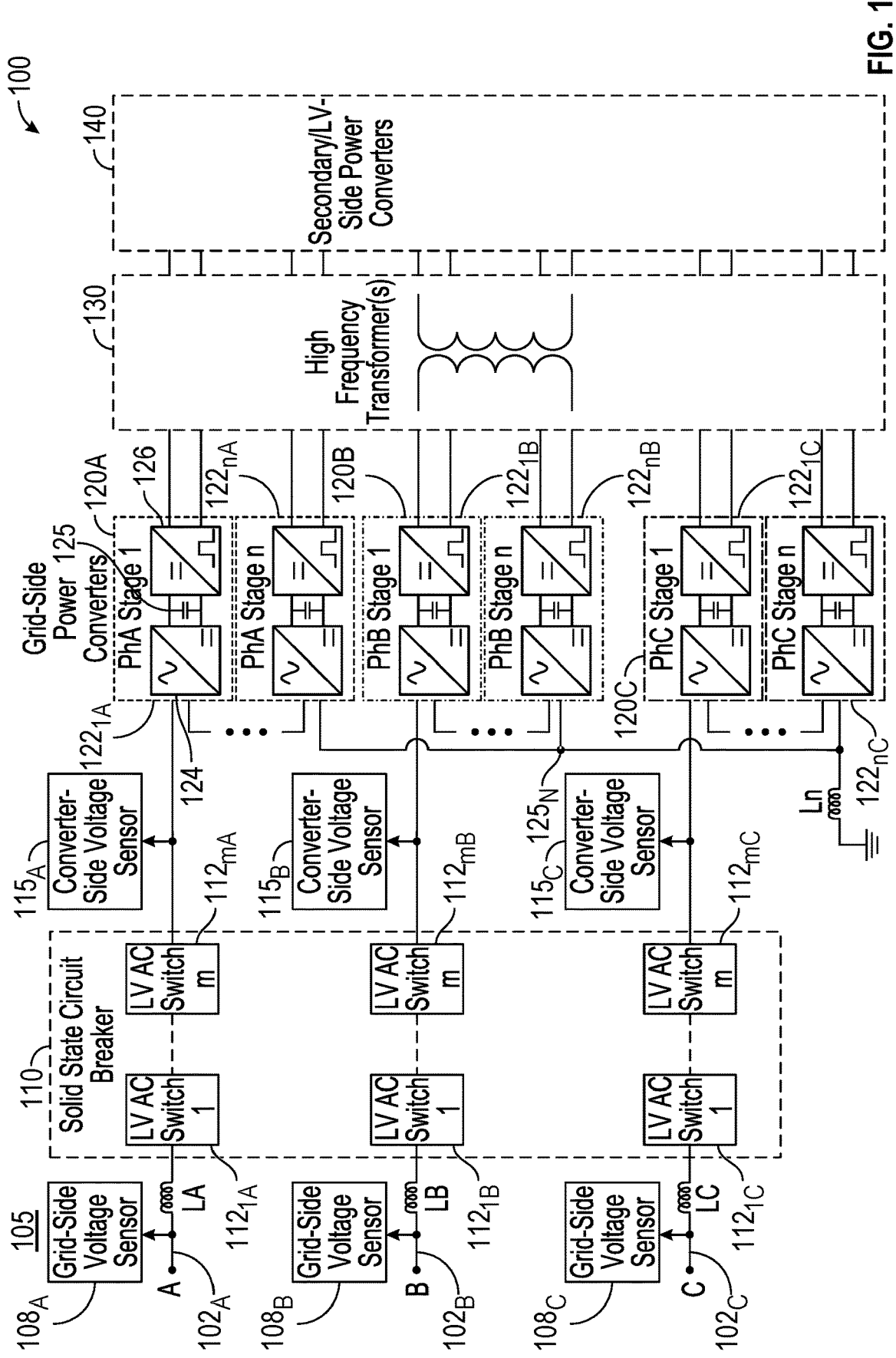
FIG. 1 is a schematic diagram of a power conversion system in accordance with an embodiment.

Referring now to FIG. 1, shown is a schematic diagram of a power conversion system in accordance with an embodiment. As shown in FIG. 1, system 100 is a grid-connected power conversion system that may directly couple to a distribution gird without one or more intervening LFTs. Although embodiments are not limited in this regard, system 100 may be an EV charging system that can be used to provide charging power to one or more charging dispensers.

In the high level shown in FIG. 1, system 100 includes a solid state circuit breaker 110 at a grid-side 105. Although while generally described as a "circuit breaker," understand that circuit breaker 110 may further provide blocker/disconnect functionality as will be described further herein. Thus more generally, component 110 also may be referred to herein as a "surge voltage blocker circuit" and even more generally as "circuit 110."

Notice that circuit 110 receives incoming three-phase grid power from three-phase input nodes $102_A$-$102_C$. Although not shown for ease of illustration in FIG. 1, understand that a surge arrestor may be provided at input nodes 102 of power conversion system 100. This incoming grid power may couple to circuit 110 through corresponding line inductors LA-LC. As further shown, each phase may have a grid-side voltage sensor $108_{A-C}$ coupled thereto to measure grid-side voltage. This sensed information can be used to perform control operations as will be described further herein.

Circuit 110 is formed of multiple low voltage AC switches 112 that are serially connected per phase. With reference to phase A, a plurality of AC switches $112_{1A}$-$112_{mA}$ are coupled in series. Although embodiments are not limited in this regard, in an example implementation for a 15 kilovolts (kV) class AC system there may be between approximately 10 and 40 AC switches per phase. Note that these AC switches may be implemented as bidirectional power switches (BPSs), e.g., each implemented as a four quadrant switch capable of conducting positive or negative on-state current and capable of blocking positive or negative off-state voltage.

Still with reference to FIG. 1, each phase may have a converter-side voltage sensor $115_{A-C}$ coupled thereto to measure a converter side voltage. This voltage information may be used in performing control operations as described further herein.

Circuit 110 couples to a plurality of grid-side power converters 120A-120C. Each power converter 120 may be formed of a plurality of cascaded power stages $122_{1-N}$, in each phase (e.g., cascaded power stages $122_{1A-nA}$ in phase A). In turn, each power stage 122 may include an AC-DC converter 124, a DC bus 125 and a DC-AC converter 126 (only enumerated in power stage $122_{1A}$). In this way, an incoming AC voltage, e.g., at a grid frequency (for example, 60 Hz), is rectified and converted to an AC voltage at a high frequency. Although embodiments are not limited in this regard, in some cases DC-AC converters 126 may output an AC voltage at a frequency between 10 kHz and 50 kHz.

Still with reference to FIG. 1, resulting high frequency AC voltages are provided to one or more high frequency transformers 130. In turn, transformers 130 provide isolated high frequency AC voltages to power converters 140. Power converters 140 may be implemented as secondary/low voltage-side power converters that are configured to receive the high frequency isolated voltage output from transformers 130 and provide a charging voltage and/or charging current at an output for a use case of an EV charger system. Although not shown in FIG. 1 for ease of illustration, understand that at an output side, power converters 140 may couple to one or more charging dispensers to which one or more EVs may couple. Of course, in other use cases the output voltages may couple to other equipment such as motors or so forth.

As further illustrated in FIG. 1, optionally a neutral inductor $L_N$ may couple between a neutral point node $125_N$ and a reference voltage node (e.g., a ground node). Understand while shown at this high level in the embodiment of FIG. 1, many variations and alternatives are possible.

Figure 2:
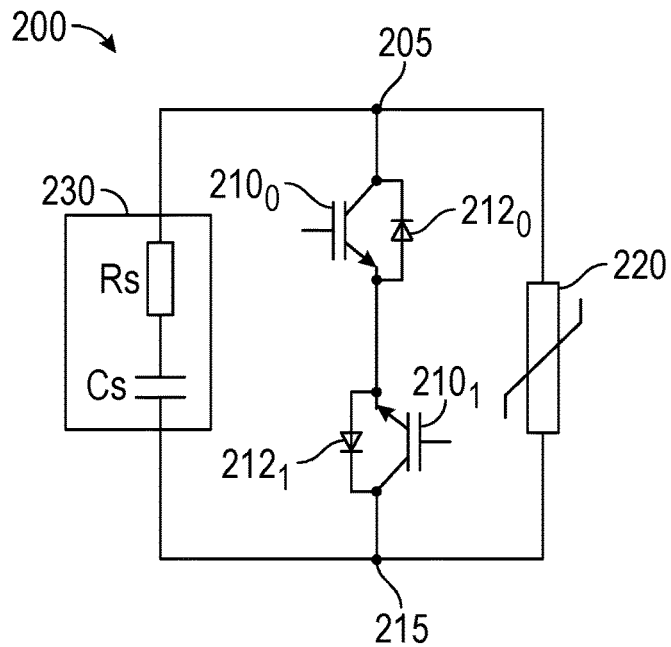
FIG. 2 is a schematic diagram of a low voltage AC switch in accordance with an embodiment.

Referring now to FIG. 2, shown is a schematic diagram of a low voltage AC switch in accordance with an embodiment. As shown in FIG. 2, low voltage AC switch 200 is a representative low voltage AC switch and related circuitry, such as may be the basic building block for the series-coupled AC switches 112 of FIG. 1 above. As illustrated, AC switch 200 includes a pair of insulated gate bipolar transistors (IGBTs) $210_0$, $210_1$. As illustrated, IGBTs 210 couple in series such that an emitter terminal of IGBT $210_0$ couples to an emitter terminal of IGBT $210_1$. In turn, corresponding collector terminals of IGBTs 210 couple, respectively, to an input node 205 and an output node 215. While described with this particular input/output configuration, this is simply for purposes of discussion and node 215 may be an input node, and node 205 may be an output node. In other cases, instead of IGBTs, other transistors such as silicon (Si) metal oxide semiconductor field effect transistors (MOSFETs), silicon carbide (SiC) MOSFETs, gallium nitride (GaN) MOSFETs or so forth may be used.

Still with reference to FIG. 2, a varistor 220 is coupled in parallel with switches 210. In the embodiment shown, varistor 200 is implemented as a metal-oxide varistor (MOV). However other types of varistors such as silicon carbide varistors may be implemented in other embodiments. Alternatively a transient-voltage suppression (TVS) diode can be used. Still with reference to FIG. 2, a snubber circuit 230 also couples in parallel with IGBTs 210. As shown, snubber circuit 230 may be implemented with an impendence $R_s$ (e.g., a resistor) and a series-coupled capacitor ($C_s$). Note that snubber circuit 230 may be implemented at the different configurations or may be eliminated.

Also, while snubber circuit 230 is shown to be coupled in parallel with both IGBTs 210, there may be multiple snubber circuits each coupled in parallel with one of the IGBTs, such that the snubber circuits are coupled in series at a first midpoint node that in turn is connected to a second midpoint node coupled between IGBTs 210. Although shown with this particular implementation, understand that AC switches may take other forms and other embodiments. For example, instead of using IGBTs as switch elements, other types of switches such as MOSFET bidirectional power switches may be used.

As further illustrated in FIG. 2, each IGBT 210 may have a respective freewheeling diode $212_0$, $212_1$ coupled in parallel between collector and emitter terminals. Although described as a separate freewheeling diode, in other cases the diode can be implemented as a body diode of the IGBT, and in either case may be implemented in a common package with the IGBT. Note that IGBTs 210 further have gate terminals. While shown as being unconnected for illustration purposes in FIG. 2, understand that these gate terminals are coupled to receive control signals from a given controller. In general, during normal operation in the absence of detection of a fault or other interrupting event, IGBTs 210 may have their gate terminals controlled to be enabled to allow incoming grid power to pass through corresponding AC switches of a circuit breaker to be provided to a corresponding grid-side power converter (or vice versa). Instead upon detection of a fault, lightning surge or so forth, the gate terminals may be disabled to prevent power flow.

Figure 3A:
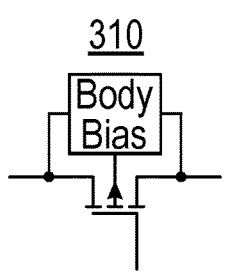
FIGS. 3A-3E are schematic diagrams of bidirectional switches in accordance with different implementations.
Figure 3B:
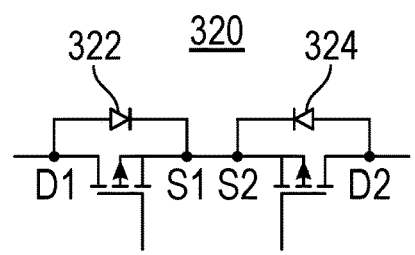
Figure 3C:
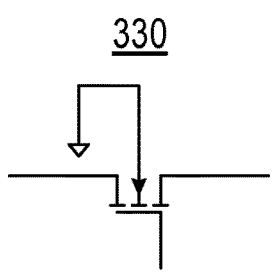
Figure 3D:
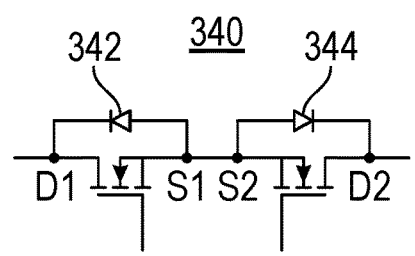

Referring now to FIGS. 3A-3E, shown are schematic diagrams of different bidirectional power switch configurations that may be used to implement the switch circuitry of AC switches in accordance with different embodiments; of course other types of bidirectional switches are possible. As shown in FIG. 3A, a first switch 310 may be implemented as a p-type MOSFET (PMOS) having source and drain terminals coupled through a body bias. In FIG. 3B, switch 320 may be implemented with back-to-back connected PMOS devices. As shown, the source terminals (S1, S2) of the two PMOS devices couple together. As further shown, oppositely coupled diodes 322, 324 each may couple between source and drain terminals of the corresponding PMOS. Referring now to FIG. 3C, another switch 330 may be implemented as a n-type MOSFET (NMOS) having source and drain terminals coupled through a body bias. FIG. 3D shows a switch circuit 340 having back-to-back connected NMOS devices in a common-source configuration. As further shown, diodes 342, 344 may couple between source and drain terminals of the corresponding NMOS devices.

Figure 3E:
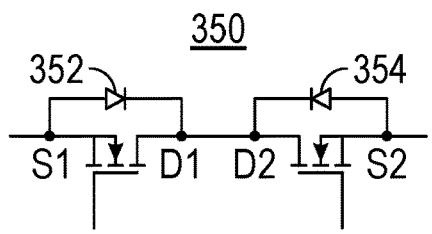

Finally with reference to FIG. 3E, it is further possible to have a configuration shown in switch circuit 350, which includes back-to-back connected NMOS devices in a common-drain configuration. As shown, the drain terminals (D1, D2) of the two NMOS devices couple together. As further shown, oppositely coupled diodes 352, 354 each may couple between source and drain terminals of the corresponding NMOS. Although shown with these limited number of possible implementations, understand that bidirectional power switches may take other forms in still other embodiments.

Figure 4A:
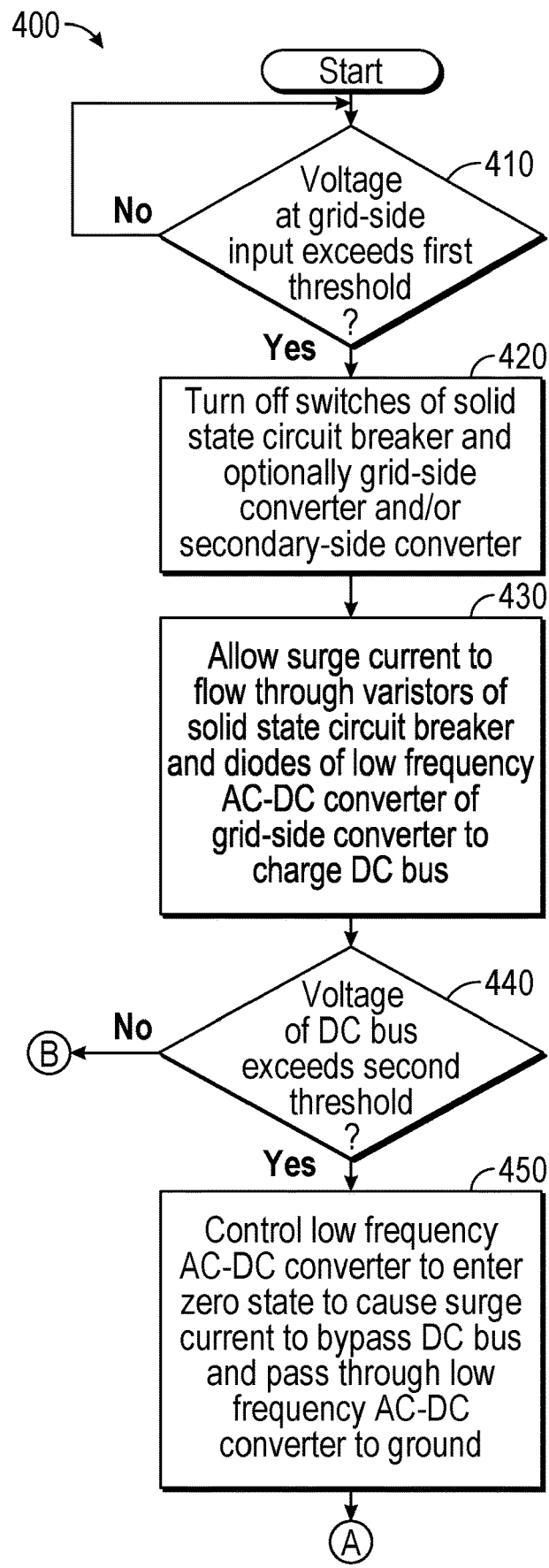
FIGS. 4A-4B is a flow diagram of a method in accordance with an embodiment.

Referring now to FIGS. 4A/4B, shown is a flow diagram of a method in accordance with an embodiment. Method 400 is a method for providing surge protection, e.g., due to a lightning strike in a power conversion system. In one or more embodiments, a controller of the system may perform method 400, along with additional other hardware circuitry, potentially further in connection with firmware and/or software.

As illustrated, method 400 begins in FIG. 4A by determining at diamond 410 whether a voltage at a grid-side input exceeds a first threshold. To this end, the controller may be configured to receive sensor information from various sensors of a system, including grid-side voltage sensors. The first threshold may be set at a level that indicates an abnormally high voltage at the grid-side.

Although embodiments may vary, as an example, this first threshold may be set at a voltage level that is between approximately 10-15 percent higher than a rated voltage level. For example when lightning hits a power grid, a large voltage surge (e.g., on the order of several hundred kVs) travels in the power grid and hits the power conversion system. A surge arrestor that is connected to an input terminal of the power conversion system may operate to clamp the voltage spike. For example, the surge arrestor may clamp the voltage spike to 95 kV in a 15 kV class power conversion system. However a large voltage spike still is present and, without an embodiment, may damage switching and other circuitry of the power conversion system.

If it is determined that the voltage exceeds this first threshold, control passes to block 420 where the controller may turn off the solid state circuit breaker. More particularly, the controller may cause the low voltage AC switches to be switched off. As further shown in FIG. 4A, optionally the controller may cause one or both of a grid-side converter and a secondary-side converter also to be turned off. At this point with the low voltage AC switches turned off, a surge current may pass through varistors of the solid state circuit breaker (block 430). Still further, this surge current may flow through the bypass diodes that couple in parallel with the IGBTs or other semiconductor device of the low frequency (grid-side) AC-DC converter. In this way, the surge current may charge a DC bus of the grid-side converter.

Still with reference to FIG. 4A, next at diamond 440, it may be determined whether the voltage of this DC bus exceeds a second threshold. This second threshold may be at a much lower level than the first threshold, and may correspond to an allowable range for the capacitor of the DC bus, e.g., 1000 volts in one implementation. If it is determined that the voltage of the DC bus exceeds the second threshold, control passes to block 450. At block 450 the controller may control the low frequency AC-DC converter to enter into a zero state to cause the surge current to bypass the DC bus (more specifically, the capacitor of the DC bus). Thus, the surge current may flow through the low frequency AC-DC converter to ground, as will be further illustrated below.

Figure 4B:
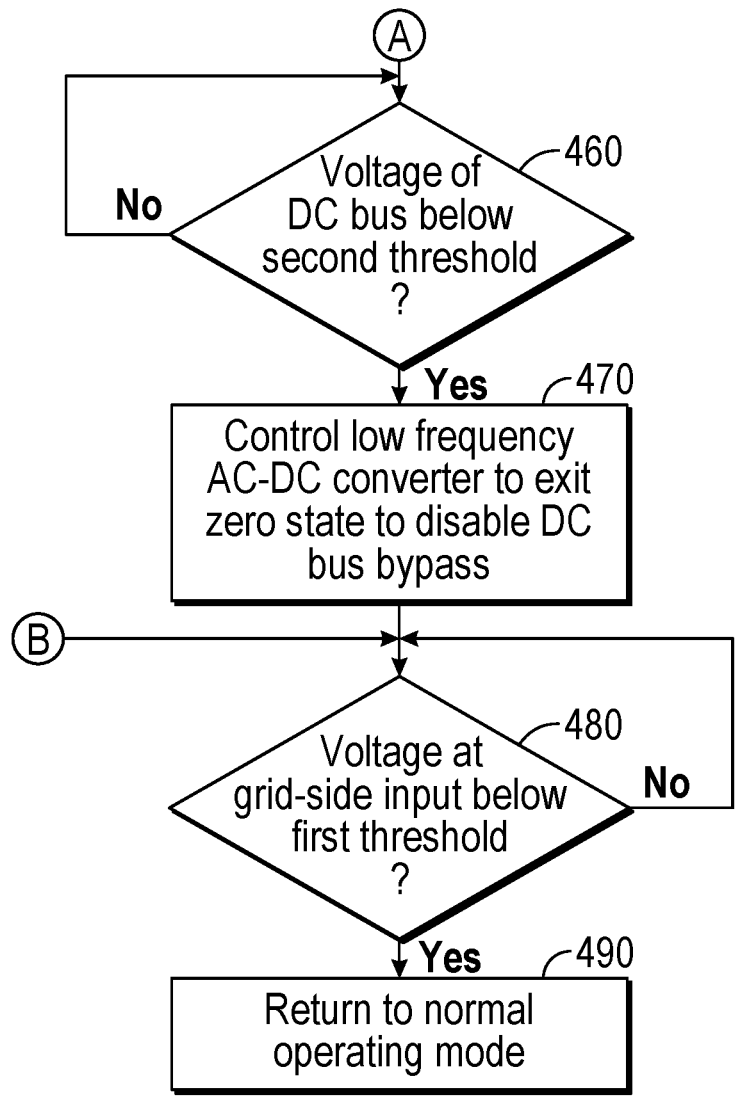

Referring now to FIG. 4B, method 400 continues by determining whether the voltage of the DC bus falls below the second threshold (diamond 460). When it does, control passes to block 470 where the controller may control the low frequency AC-DC converter to exit the zero state to disable bypassing the DC bus. Control next passes to diamond 480 to determine whether the voltage at the grid-side input is below the first threshold. When it is, the surge has been successfully resolved, and thus the controller may allow operation to return to a normal operation mode (block 490). In this mode, the low voltage AC switches of the circuit breaker may be switched on to allow the normal grid power level to be provided to the low voltage AC-DC converter of the grid-side converter. Accordingly, the switching elements of the grid-side converter (and secondary-side converter) may be appropriately controlled to cause a desired charging voltage and/or charging current to be provided to a load. Understand while shown at this high level in the embodiment of FIGS. 4A/4B, many variations and alternatives are possible.

Figure 5A:
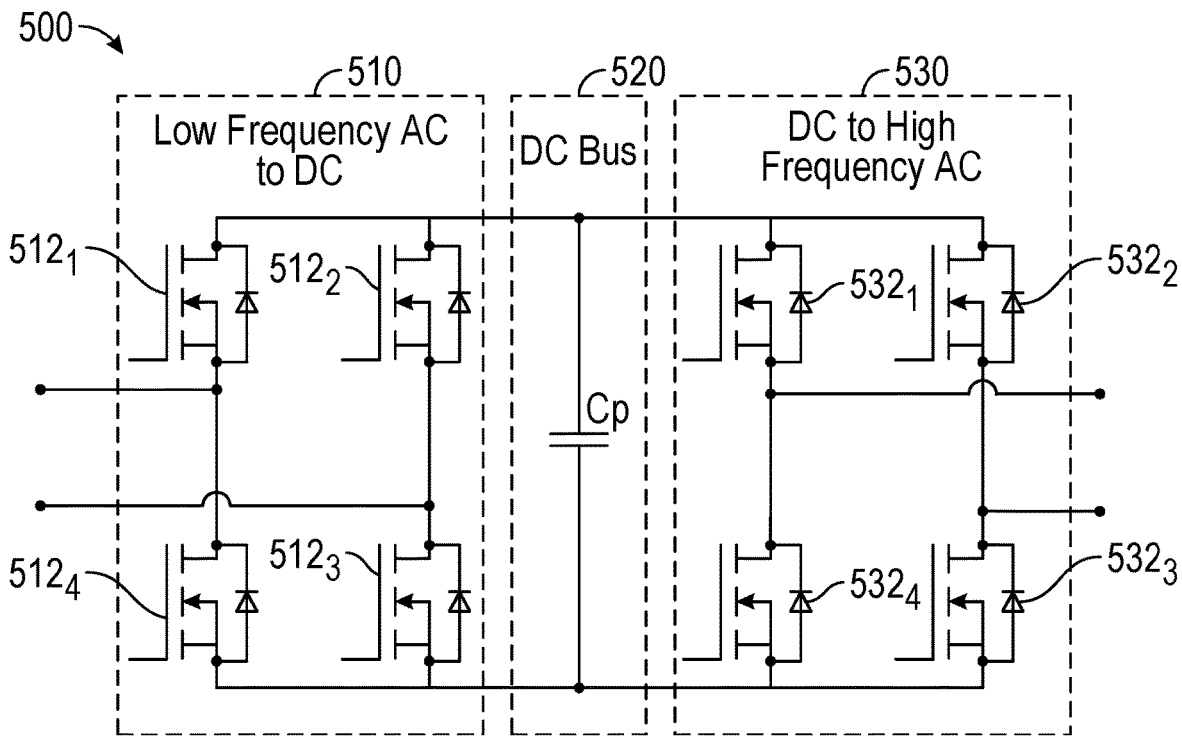
FIG. 5A is a schematic diagram of a grid-side converter in accordance with an embodiment.

Referring now to FIG. 5A, shown is a schematic diagram of a grid-side converter in accordance with an embodiment. In FIG. 5A, a grid-side converter is shown at a high level, namely, one power stage 500 of one phase of a grid-side converter. Understand that each phase may include multiple cascaded power stages.

As shown, power stage 500 includes a low frequency AC-DC converter 510, a DC bus 520 and a DC-AC converter 530 (which converts the DC voltage to a high frequency AC voltage). As illustrated, converter 510 includes a first plurality of NMOS devices $512_{1-4}$, each of which having a diode coupled between source and drain terminals. Converter 530 similarly includes a second plurality of NMOS devices $532_{1-4}$, each of which having a diode coupled between source and drain terminals. DC bus 520 includes a capacitor Cp. Note that NMOS devices $512_{1-4}$ can be replaced with IGBTs.

Figure 5B:
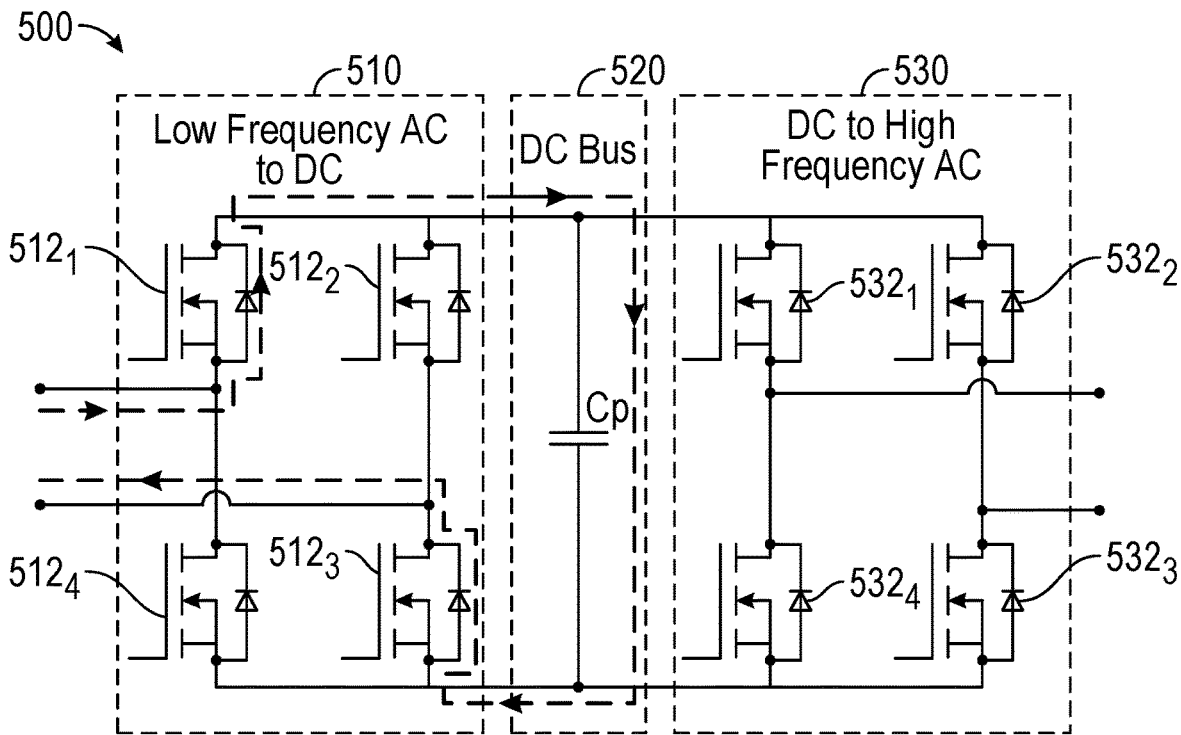
FIGS. 5B-5C are schematic diagrams of the grid-side converter in operation in accordance with an embodiment.

FIG. 5B shows an illustration of the power stage having a surge current path (shown in dashed line) after the power stage is disabled during a surge event. As illustrated, this surge current flows through a first diode associated with NMOS device $512_1$, through DC bus 520, and thereafter through another diode associated with NMOS device $512_3$, which may be coupled in antiparallel (e.g., as a freewheeling diode). In this way, the surge current charges the capacitor of DC bus 520 to an allowable voltage level (e.g., 1000V).

Figure 5C:
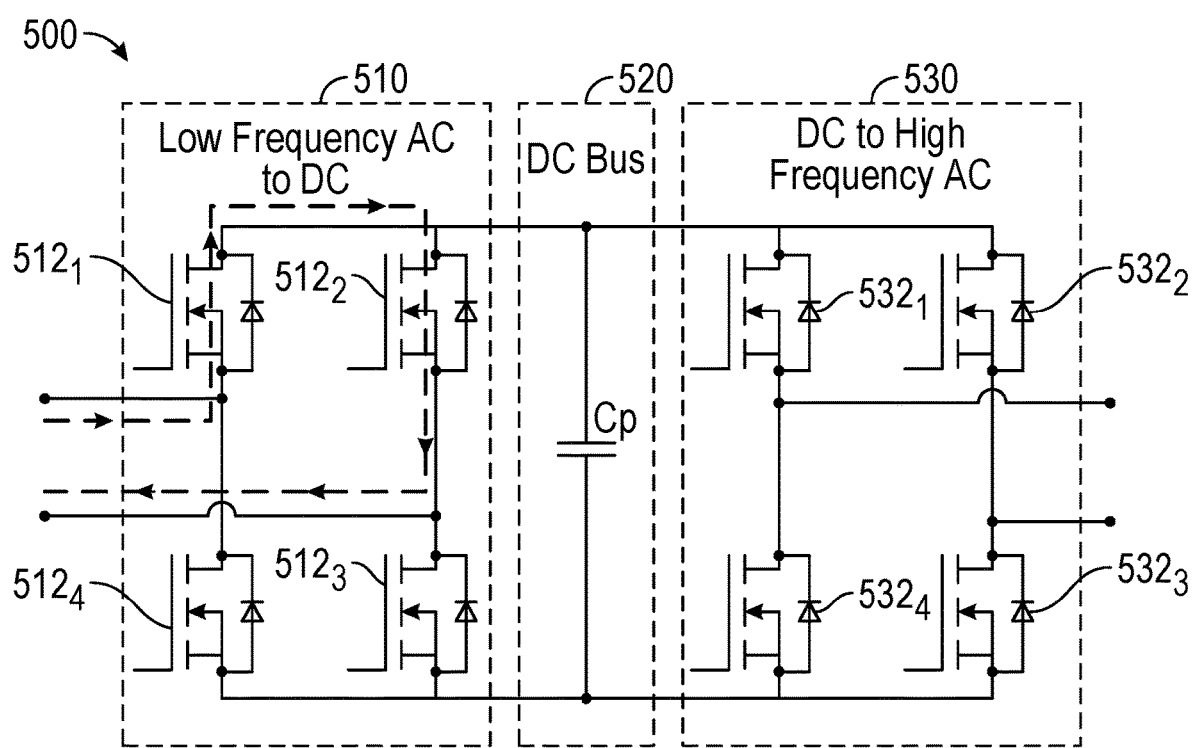

However, should the voltage of DC bus 520 exceed this level, the controller may cause converter 510 to enter a zero state to bypass DC bus 520. Thus as illustrated in FIG. 5C, NMOS devices $512_{1,2}$ are enabled such that the surge current passes through these switches and then back out of converter 510 to ground, effectively bypassing DC bus 520.

Figure 6:
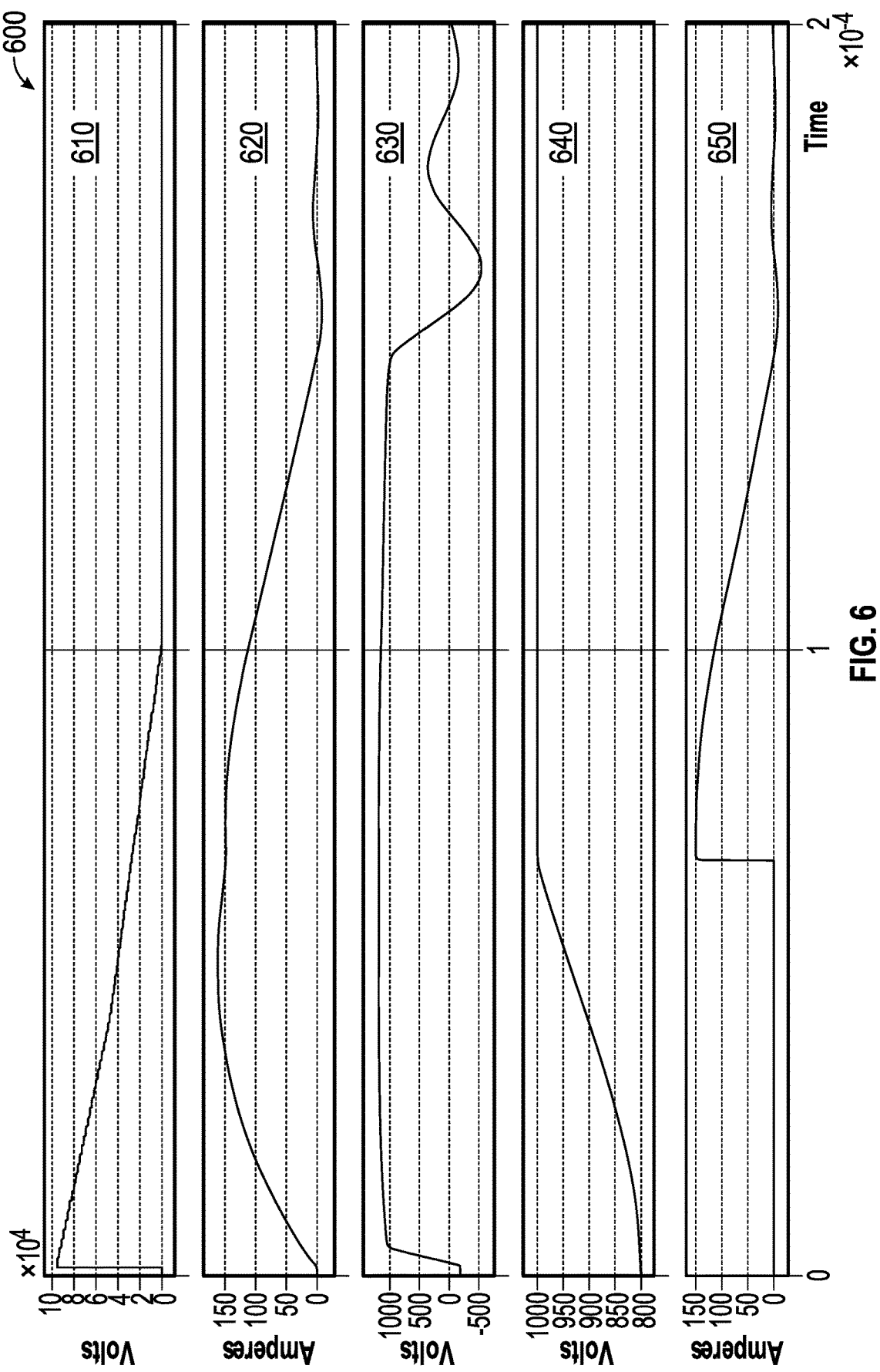
FIG. 6 includes timing diagrams of operation according to one embodiment.

Referring now to FIG. 6, shown is a set of timing diagrams illustrating operation in accordance with an embodiment. As shown in FIG. 6, timing diagrams 610-650 illustrate operation at various locations within a power conversion system having a circuit breaker in accordance with an embodiment.

As shown in FIG. 6, in illustration 610 a voltage surge occurs, e.g., due to a lightning strike, which causes an extremely high amount of voltage to be received at an input of the system (e.g., on the order of up to approximately 100 kV). In illustration 620, a phase current through a low voltage AC-DC power stage is shown. As seen, this current increases and then decreases based on the surge protection operation described herein. Illustration 630 shows a blocking voltage presented by each AC switch. As discussed, in different implementations a given number of serially-connected AC switches may be present in each phase of the circuit breaker. As shown, the voltage quickly reaches a maximum level, and falls off as the surge passes.

Illustration 640 shows a DC bus voltage, which rises as the capacitor of the DC bus is charged by way of the surge current until it hits a threshold level, at which point operation enters into a bypass mode. Note with reference to illustration 650 that the current in the low frequency AC-DC converter rises to a high level when the bypass mode is entered, and thereafter it tapers off as the surge passes and operation of a normal mode may continue. Although shown with representative voltage and current levels, and approximate time durations, operation of a solid state circuit breaker may be controlled to vary in other cases.

Figure 7A:
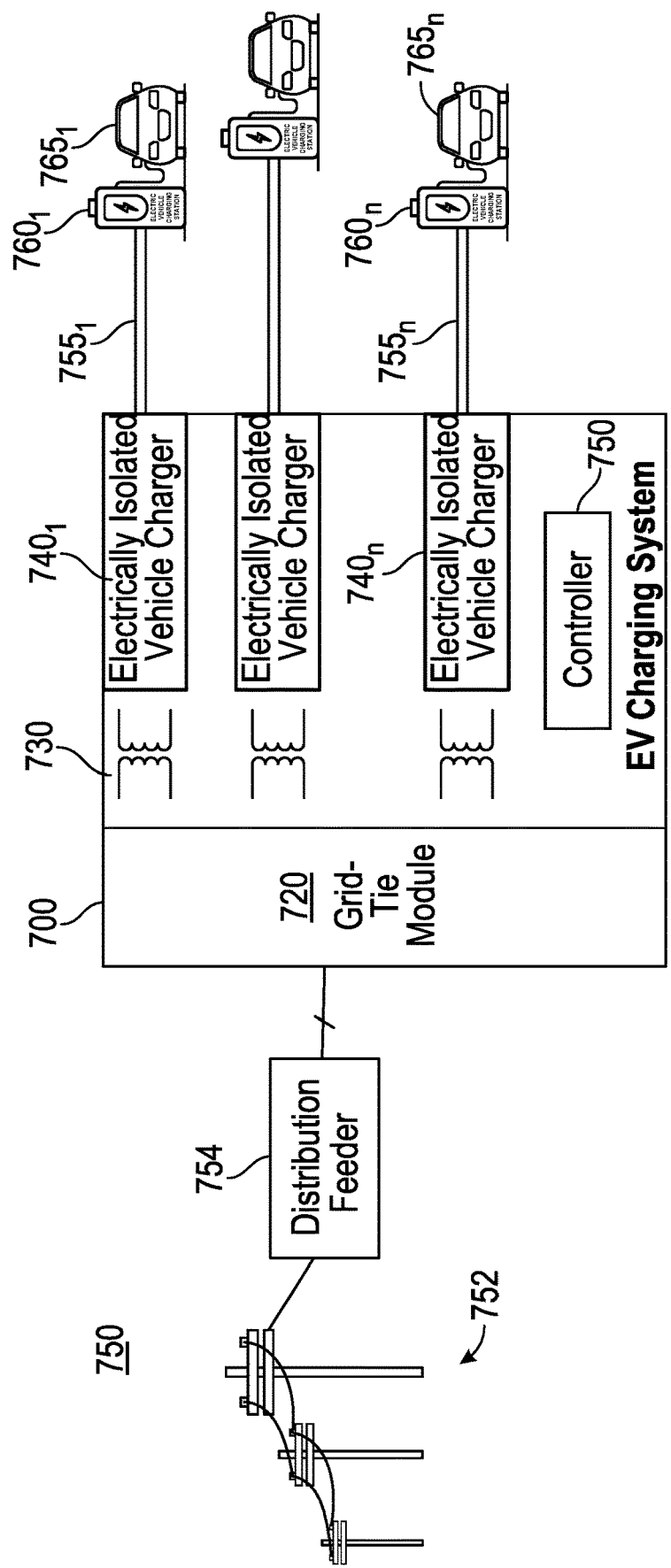
FIG. 7A is a block diagram illustrating an environment in which an EV charging system accordance with an embodiment may be used.

A surge voltage blocker circuit in accordance with an embodiment can be incorporated in many different system types, including a variety of power conversion systems such as EV charging systems (including those illustrated in FIGS. 7A-11, discussed below). Referring now to FIG. 7A, shown is a block diagram illustrating an environment in which an EV charging system having surge protection circuitry in accordance with an embodiment may be used. More particularly in FIG. 7A, an EV charging system 700, which may be a distributed modular-based charging system, couples between a grid network 750 (represented by transmission lines 752 and a distribution feeder 754) and multiple EV charging stations 760$_1$-760$_n$ (also referred to herein as "dispensers"), each of which may be implemented with one or more EV distributors to enable charging of an EV (representative EVs 765$_1$-765$_n$ are shown in FIG. 7A).

More specifically, embodiments may be used for use with distribution grid networks that provide power at medium voltage levels (e.g., between approximately 1000 volts (V) and 35000V) and at a low frequency (e.g., 50 or 60 Hertz (Hz)). For ease of discussion, understand that the terms "grid," "grid network" or "distribution grid network" are to be used interchangeably to refer to a power distribution system that provides medium voltage power at low frequency. With embodiments herein, an EV charging system such as charging system 700 may directly couple to a medium voltage distribution grid network (which may be an AC voltage grid or a DC voltage grid) without an intervening power transformer.

In this way, EV charging system 700 may directly receive incoming grid power with a grid voltage at a medium voltage level and a low frequency. As used herein, the terms "direct connection" and "direct coupling" with respect to an EV charging system mean that this system receives distribution grid power at a distribution grid network-provided grid voltage at a distribution grid network low frequency without presence of intervening components. Note that an EV charging system may couple to a grid network through circuitry including a surge voltage blocker circuit as described herein, and still be considered to be in a "direct coupling" with the grid network. Charging system 700 may be implemented as a modular facility. Still further as the need for a power transformer is avoided, EV charging system 700 may be implemented with a relatively small and low cost arrangement.

Still with reference to FIG. 7A, distribution feeder 754 of grid network 750 may be a medium voltage AC or DC distribution feeder. As illustrated, distribution feeder 754 is directly coupled to EV charging system 700 via three-phase connections (of course, intervening surge voltage blocker circuitry as described herein may be present).

Charging system 700 includes a grid-tie module 720. In embodiments herein, grid-tie module 720 may be configured to receive grid power at an incoming grid voltage (which as described above may be an AC or DC voltage) and perform an initial conversion of the incoming grid voltage to a voltage that is at different magnitude and/or frequency. Depending on implementation, grid-tie module 720 may convert the incoming grid voltage to one or more DC or AC voltages at different magnitude or frequency. To this end, grid-tie module 720 interfaces with medium voltage AC or DC grid network 750 and utilizes power electronics converters to convert the AC or DC grid voltage to a voltage that is at different magnitude and/or frequency. Grid-tie module 720 may include multiple stages that may be isolated from each other. In other implementations, at least some of these stages may be cascaded together to increase voltage capabilities.

In particular embodiments herein, grid-tie module 720 may include power electronics-based converters to convert the incoming AC or DC grid voltage. As an example, grid-tie module 720 may include H-bridge power converters to receive the incoming grid voltage and perform a voltage/frequency conversion, e.g., to a DC voltage. In turn, grid-tie module 720 may further include a first stage of a DC-DC converter to convert the DC voltage to a high frequency AC voltage (e.g., a square wave voltage) at a given high frequency (e.g., between 5 kilohertz (kHz) and 100 kHz).

As further illustrated in FIG. 7A, this high frequency AC voltage may be provided to a transformer network 730. In the embodiment shown in FIG. 7A, transformer network 730 includes multiple isolated transformers, each having a single primary winding and a single secondary winding. In other implementations a transformer network may take the form of a single transformer having a single primary winding and multiple secondary windings. In either case, transformer network 730 is configured as a high frequency transformer. In embodiments, transformer network 730 may operate at frequencies between approximately 5 kHz and 100 kHz. Transformer network 730 outputs galvanically isolated AC voltages. In this way, transformer network 730 provides electrical isolation between distribution feeder 754 and EV charging stations 760.

Still referring to FIG. 7A, the secondary windings of transformer network 730 each may be coupled to an electrically isolated vehicle charger 740$_1$-740$_n$. In embodiments herein, each vehicle charger 740 may be configured as a power electronics converter that converts the secondary voltage output by transformer network 730 to a voltage (e.g., DC) at a different frequency and/or magnitude. More particularly for vehicle charging as described herein, vehicle chargers 740 may include DC-DC converters to provide charge capabilities to at least one EV charging station 760.

Continuing with the above discussion in which an AC voltage is output from transformer network 730, vehicle chargers 740 may include an AC-DC converter as well as a DC-DC converter to provide charging capability at a desired charging voltage and/or charging current.

Figure 7B:
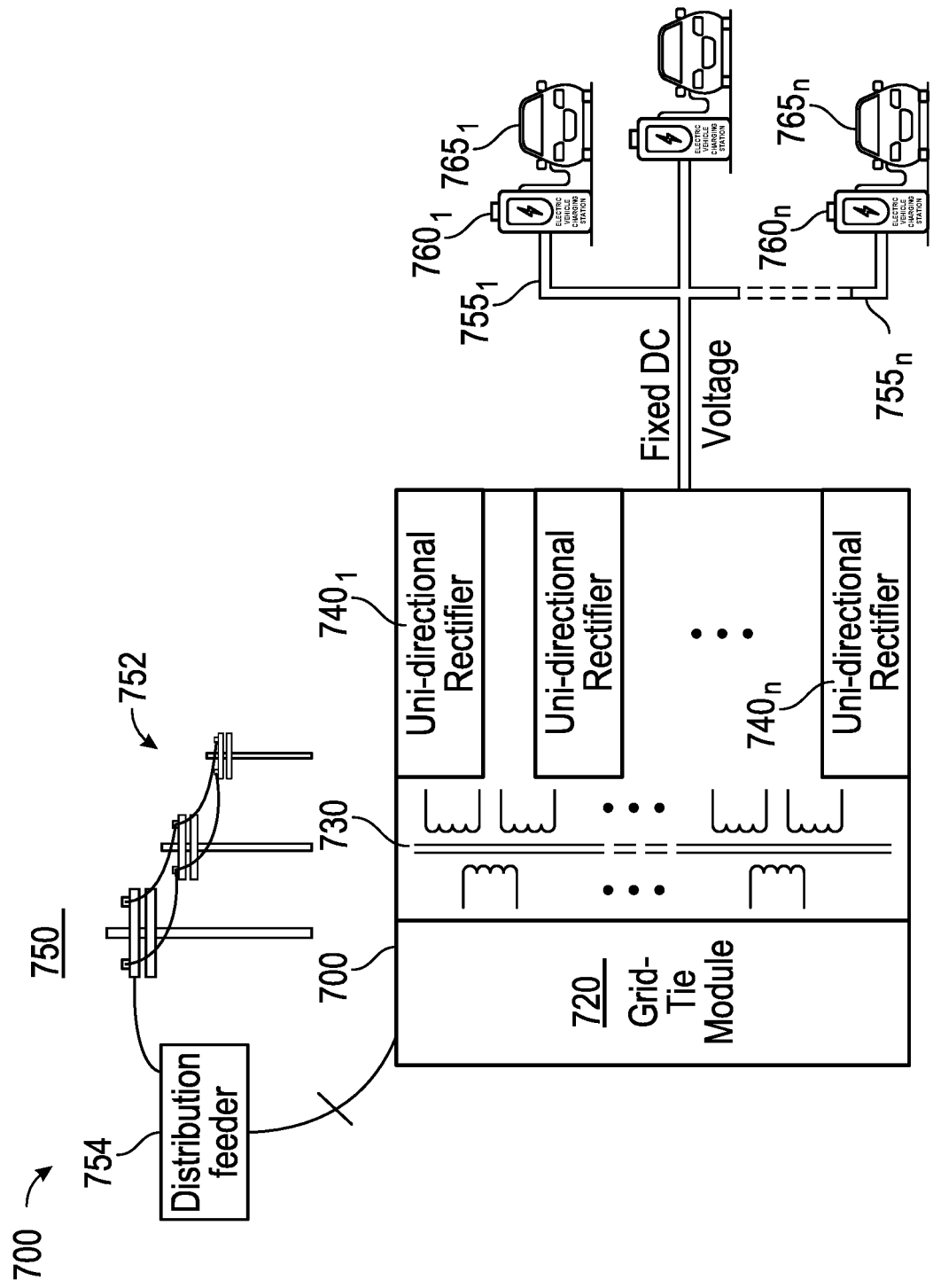
FIG. 7B is a block diagram illustrating another environment in which an EV charging system accordance with an embodiment may be used.

As shown in FIG. 7A, EV charging system 700 may be coupled to charging stations 760 via a plurality of output lines 755$_1$-$n$. Although different connection topologies are possible (including direct connection as shown in FIG. 7B, discussed below), FIG. 7A shows an implementation in which each output line 755 is dedicated to a single charging station 760.

To effect control of EV charging system 700, at least one controller 750 may be present. In various embodiments, controller 750 may include one or more central processing units (CPUs) or systems on chip (SoCs), a dedicated microcontroller or other programmable hardware control circuit such as programmable logic. In one embodiment, controller 750 may form a distributed control architecture. In any case, controller 750 may be configured to execute instructions stored in one or more non-transitory storage media. Such instructions may cause controller 750 to automatically and dynamically control charging voltages and/or charging currents depending upon capabilities and requirements of charging stations 760 and/or connected EVs 765.

Controller 750 may be configured to control, in addition to one or more configurable charging modes, one or more generation and/or storage modes, in which energy stored in one or more batteries of an EV may be stored within a storage within or coupled to EV charging system 700 (such as one or more batteries (not shown for ease of illustration in FIG. 7A)) or provided as energy to the grid, e.g., via connection to distribution feeder 754, as will be described further herein. Although shown with this particular implementation in the embodiment of FIG. 7A, many variations and alternatives are possible. For example, an EV charging system may be configured to directly connect to EVs via integrated vehicle charging connectors.

In still further implementations an EV charging system also may include capabilities to provide load power to a variety of AC loads, such as industrial facilities or so forth. In addition, the EV charging system may be configured to receive incoming energy, such as from one or more photovoltaic arrays or other solar panels and provide such energy, either for storage within the EV charging system, distribution to the grid and/or as charging power to connected EVs.

Referring now to FIG. 7B, shown is a block diagram illustrating another environment in which an EV charging system in accordance with an embodiment may be used. More specifically in FIG. 7B, an EV charging system 700 couples between a grid network 750 (represented by transmission lines 752 and a distribution feeder 754) and multiple EV charging stations 760$_1$-760$_n$ (dispensers 760) each of which may couple to one or more EVs 765$_{1-n}$.

As illustrated in FIG. 7B, EV charging system 700 may generally be configured similarly to EV charging system 100 of FIG. 7A (and thus reference numerals generally refer to the same or similar components, albeit of the "700" series in place of the "700" series of FIG. 7A). However in this implementation, a transformer 730 is implemented as a single high frequency transformer having multiple primary windings and multiple secondary windings. Each set of secondary windings in turn may couple to a corresponding unidirectional rectifier 740$_1$-740$_n$. By providing unidirectional rectifiers 740, power flow occurs only in a single direction, namely from charging system 700 to connected EVs 765 as a given charging voltage or charging current.

Thus EV charging system 700 couples directly to a distribution network and provides a regulated fixed DC voltage to one or more dispensers 760. In one or more embodiments, dispensers 760 may receive a fixed DC voltage (e.g., at 1000V) and provide an appropriate charge voltage or charge current as requested by each EV 765. Note that dispensers 760 may provide electrical isolation between each EV 765. In other implementations, a charging system may include an integrated dispenser (not separately shown) to which a medium or heavy duty EV 765 may couple, such as for highway truck charging.

Figure 7C:
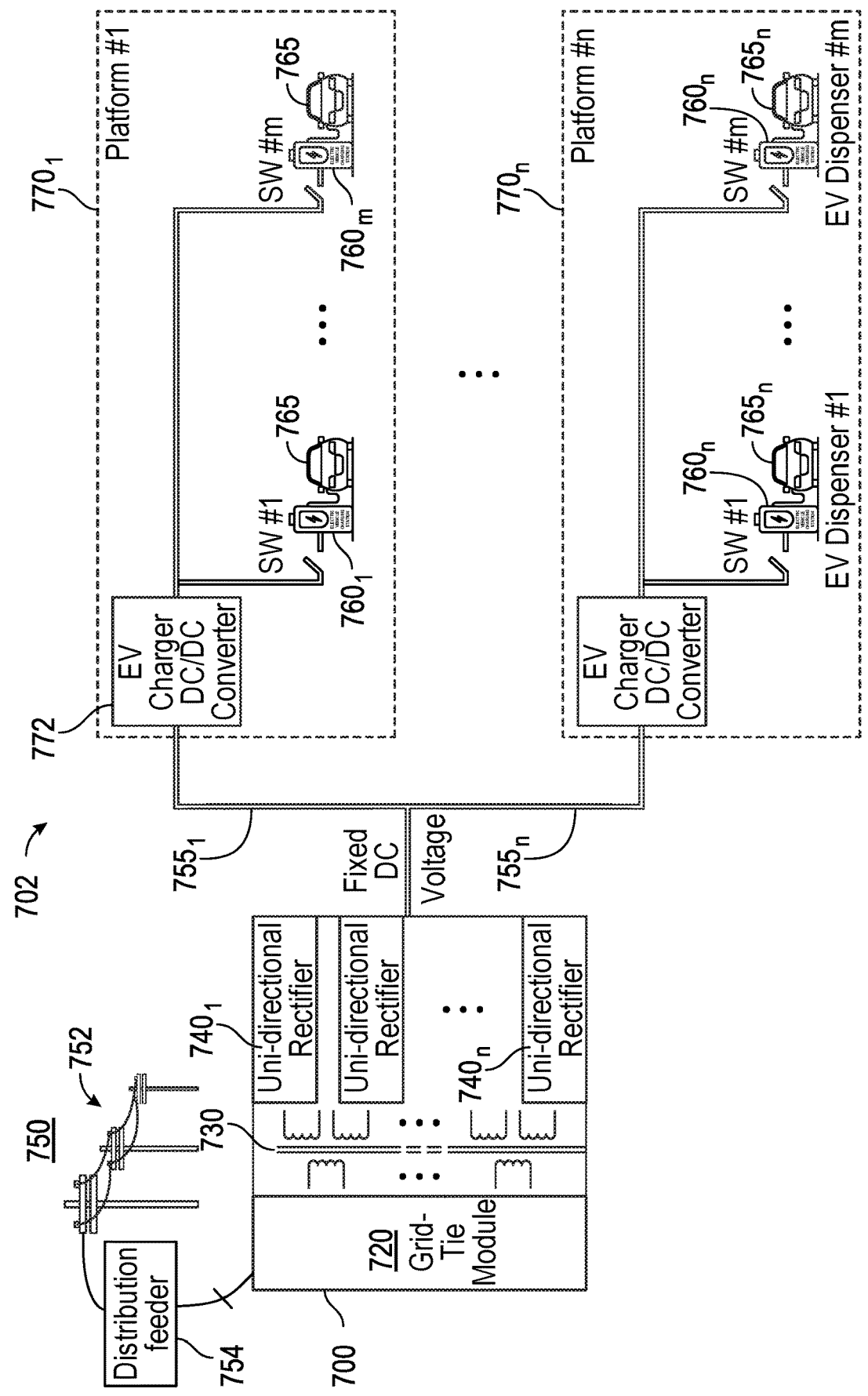
FIG. 7C is a block diagram illustrating yet another environment in which an EV charging system accordance with an embodiment may be used.

Yet other implementations are possible. Referring now to FIG. 7C, shown is a block diagram of an EV charging system in accordance with yet another embodiment. As shown in FIG. 7C, charging system 702 may generally take the same form as in FIG. 7A, and thus is shown with the same reference numbers as used in FIG. 7A. However here, charging system 702 provides for fleet EV charging. In this implementation, a plurality of charging platforms 770$_1$-770$_n$ are coupled to receive a fixed DC voltage (e.g., 1500V) output from charging system 702.

As shown with regard to representative charging platform 770$_1$, included is a DC/DC converter 772 to which a plurality of switches (SW #1-SW #m) may couple. As such, EV charger DC/DC converter 772 is shared among multiple EV dispensers 760. As illustrated, each switch couples to a corresponding dispenser 760$_{1-m}$ to which a given EV 765 (part of a EV fleet) may be coupled. EV charger DC/DC converter 772 may provide isolation and a charging voltage or charging current requested by EV 765

In this embodiment, charging system 702 may provide a low-cost solution for fleet EV charging. The configuration can charge m×n EVs (where m is the number of dispensers per platform, and n is the number of platforms) during off duty (e.g., overnight). In operation, switches SW can switch on dispensers 760 to charge EVs 765 in sequence. Using this configuration minimizes the required power rating of converters since the vehicles may charge in sequence. For example, charging system 702 can be rated at 900 kW that provides 600A at 1500V DC. The EV charger DC/DC converter 772 power rating can be 150 kW that can provide a maximum of 150 kW of power to EV 765 that is being charged by selection of a given switch SW Furthermore a controller (e.g., a programmable logic controller) may control the charging functions of platforms 770 based on temperature of EV battery or state of charge to optimize the battery life and/or charging times. By switching the charging between EV's 765 of a platform based on temperature and/or state of charge, speed of charging in a platform increases and the life of the battery may extended. Understand that variations and modifications of implementations of the embodiments described herein may lead to other fleet charging configurations.

Figure 8:
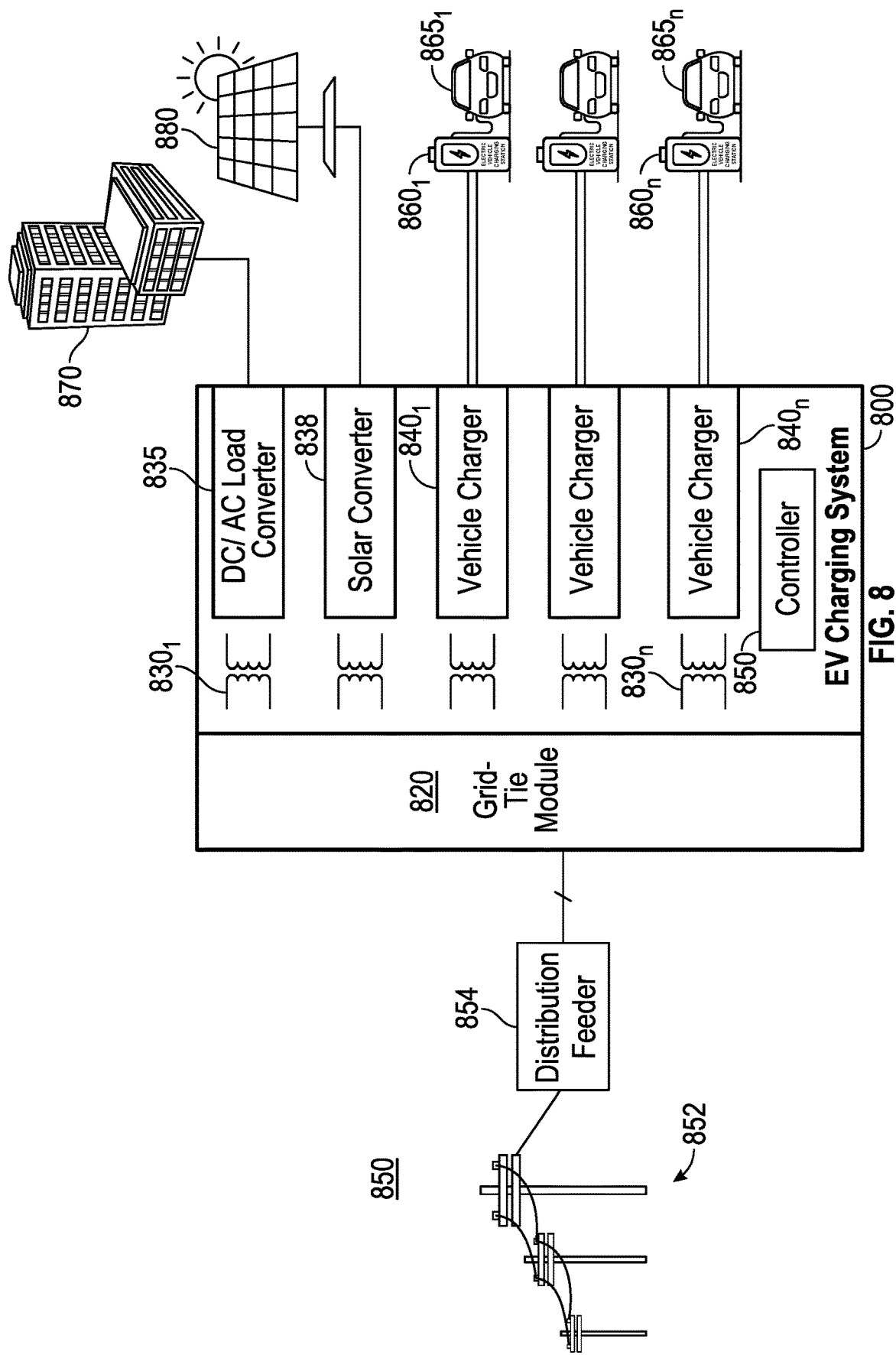
FIG. 8 is a block diagram illustrating an environment in which an EV charging system in accordance with another embodiment may be used.

Referring now to FIG. 8, shown is a block diagram illustrating an environment in which an EV charging system in accordance with another embodiment may be used. More particularly in FIG. 8, an EV charging system 800 may be generally similarly configured the same as EV charging system 700 of FIG. 7A (and thus reference numerals generally refer to the same components, albeit of the "800" series in place of the "700" series of FIG. 7A). However in this embodiment, system 800 includes at least one DC-AC load converter 835 to provide AC power to a facility 870. As further shown, system 800 also includes a solar converter 838 that may couple to a solar photovoltaic panel 880. In this way, incoming solar energy can be provided to grid network 850, to EV charging stations 860 and/or stored in an energy storage (such as a battery system of system 800 (not shown for ease of illustration in FIG. 8)). Thus with this embodiment, EV charging system 800 may couple to one or multiple AC or DC loads and/or to one or multiple solar photovoltaic panels. Still further implementations are possible. For example, an isolated vehicle charger section can interface with multiple EV charging dispensers.

Figure 9:
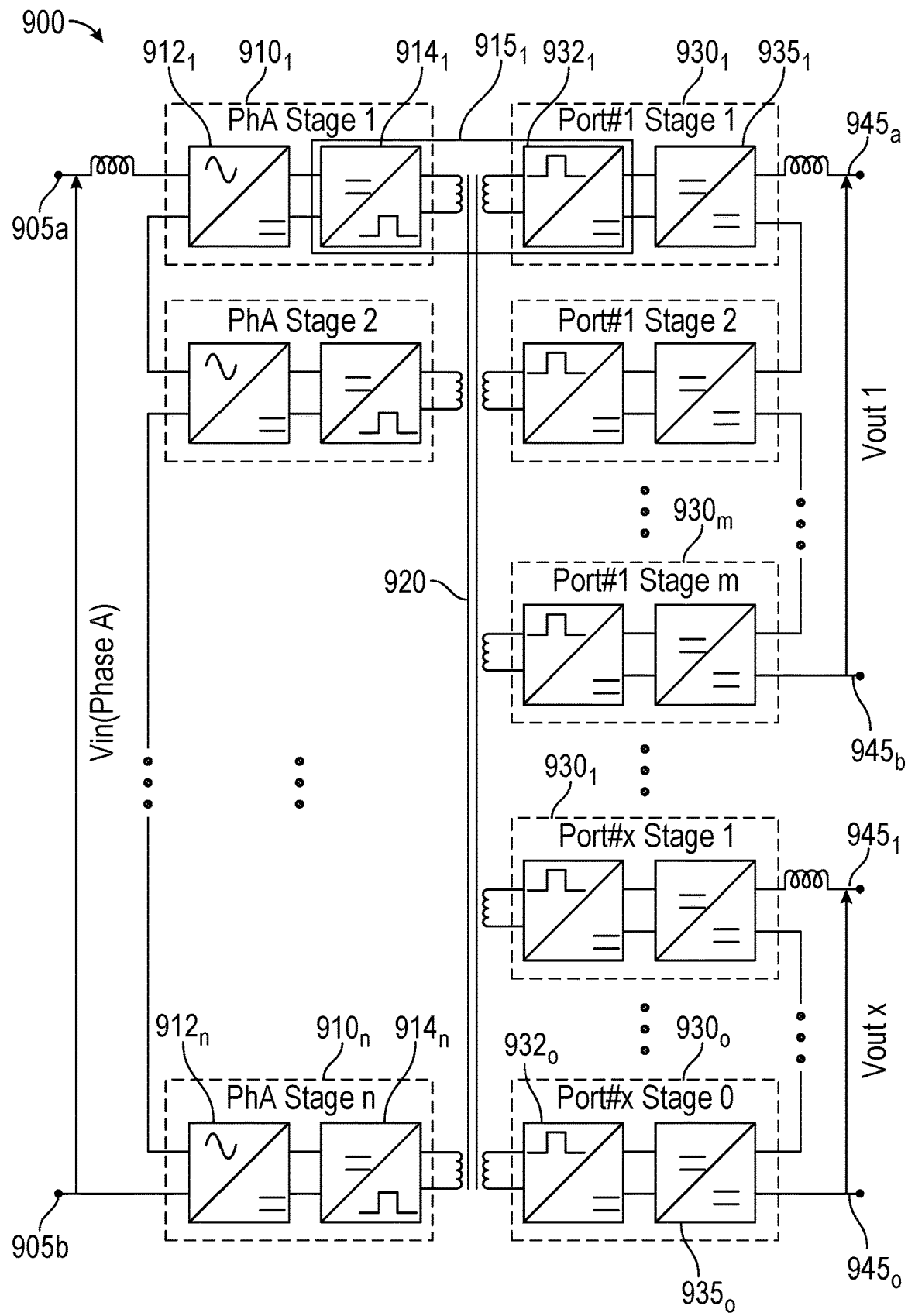
FIG. 9 is a block diagram of an EV charging system in accordance with a particular embodiment.

As described above, different configurations of EV charging systems are possible. Referring now to FIG. 9, shown is a block diagram of an EV charging system in accordance with a particular embodiment. As shown in FIG. 9, EV charging system 900 is a multi-port modular power converter that uses a single transformer. In FIG. 9, understand that a single phase is illustrated for ease of discussion. In a given charging system there may be three phases, each configured as shown in FIG. 9 or combined as a single transformer.

Incoming grid power is received, after coupling through a surge voltage blocker circuit as described herein, at a given grid voltage via input nodes 905$a$, 905$b$. Although embodiments are not limited in this regard, in FIG. 9 this grid voltage may be received as a medium AC voltage, e.g., at a voltage of between approximately 1 and 50 kV and at a grid frequency of 50 Hz or 60 Hz. As shown, an input inductance couples to input node 905*a* (however the surge voltage blocker circuit is not shown for ease of illustration).

The incoming voltage is provided to a plurality of input stages, each of which may include multiple H-bridge converters. More specifically, a plurality of input stages $910_1$-$910_n$ are shown that are cascaded together. Each input stage may include a grid-side converter $912_{1-n}$ (shown as an AC-DC converter). In turn each grid-side converter 912 couples to a DC-AC converter $914_1$-$914_n$ of a given DC-DC converter $915_1$-$915_n$. Thus each grid-side converter 912 receives an incoming grid AC voltage and converts it to a DC voltage, e.g., at the same or different voltage magnitude. While embodiments may typically implement converters 912 and 914 that are symmetric, it is also possible for there to be asymmetric configurations across power stages.

In an embodiment, each grid-side converter 912 may be implemented as an H-bridge converter including low voltage or medium voltage switches, e.g., SiC devices. In other embodiments, each grid-side converter 912 may be formed as a multi-level rectifier. The resulting DC voltages are in turn provided to corresponding DC-AC converters 914 that act as an input stage of an isolated DC-DC converter 915. In embodiments, converters 914 may be implemented as H-bridge converters to receive the DC voltage and convert it to a high frequency AC voltage, e.g., operating at a frequency of up to 100 kHz. While a square wave implementation is shown in FIG. 9, understand that in other cases the AC voltage may be sinusoidal.

The high frequency voltage output from converters 914 may be provided to a corresponding primary winding of a transformer 920, namely a high frequency transformer. While shown in FIG. 9 as a single transformer with multiple primary windings and multiple secondary windings, in other implementations separate transformers may be provided, each with one or more primary windings and one or more secondary windings.

In any event, the galvanically isolated outputs at the secondary windings of transformer 920 may be provided to a plurality of output stages $930_1$-$930_o$. As such each output stage 930 includes an AC-DC converter $932_1$-$932_o$ (of a DC-DC converter 915). Thereafter, the output DC voltage may be further adjusted in magnitude in corresponding load-side converters $935_1$-$935_o$ (and $935_1$-$935_o$).

As illustrated, output stages 930 thus include a given output stage (namely stage 932) of a DC-DC converter 915 and a load-side converter 935. As shown in FIG. 9, multiple output stages 930 may couple together in cascaded fashion (e.g., either in a series connection as shown in FIG. 9 or in a parallel connection) to provide a higher output voltage and/or current depending upon load requirements. More specifically, a first set of output stages $930_1$-$930_m$ are cascaded together and couple to output nodes $945_{a,b}$. In turn, a second set of output stages $930_1$-$930_o$ are cascaded together and couple to output nodes $945_{1,o}$. The resulting outputs are thus at a given DC voltage level and may be used as a charging voltage and/or current for connected EVs. While this particular arrangement with cascaded input and output stages are shown in FIG. 9, understand that a multi-port power converter may be implemented in other manners such as using modular high frequency transformers. Still further, understand that the actual included DC-DC converters may have a variety of different topologies.

Figure 10:
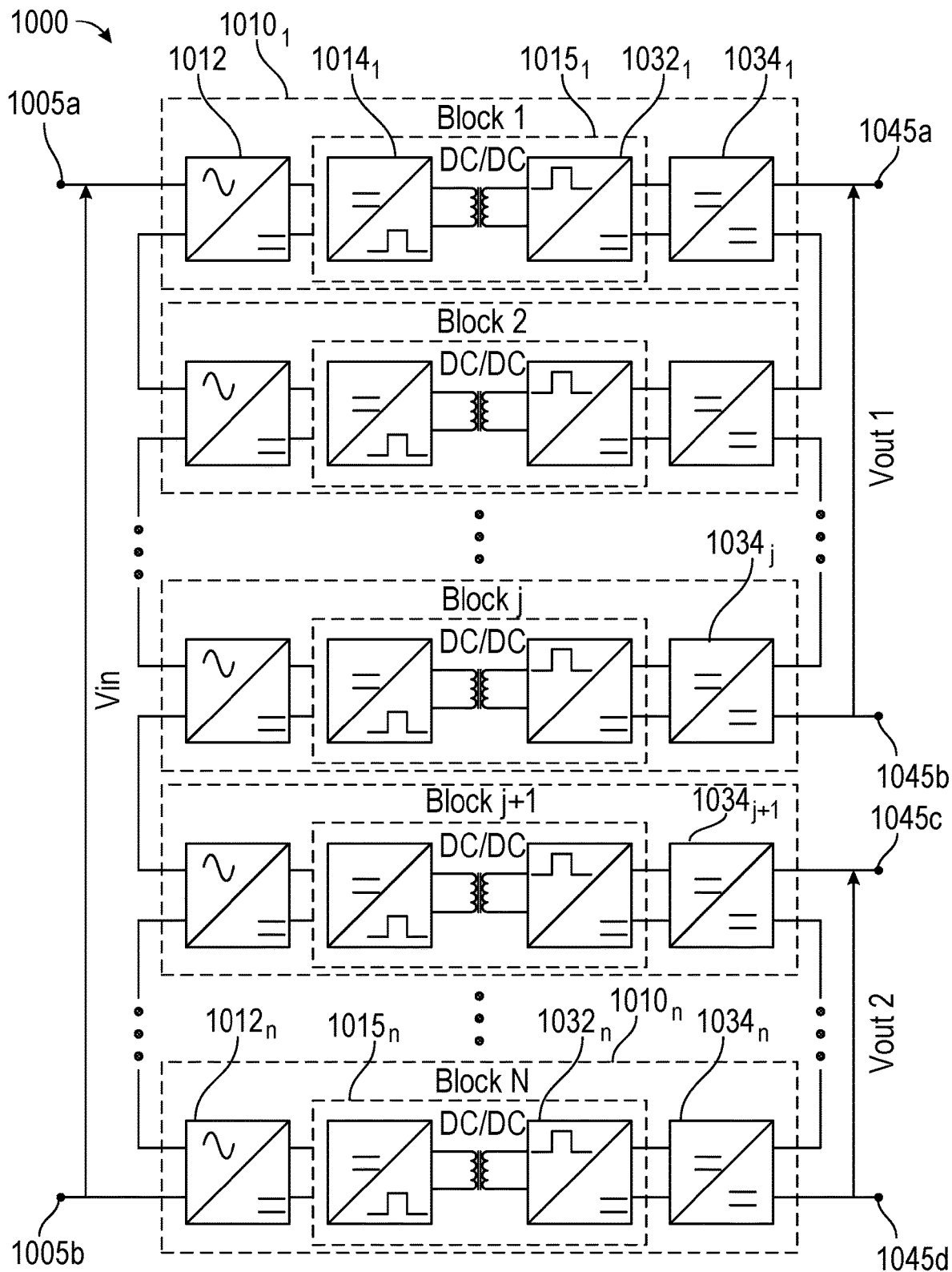
FIG. 10 is a block diagram of an EV charging system in accordance with another embodiment.

For example, in other cases a modular high frequency transformer may be used. Referring now to FIG. 10, shown is a block diagram of an EV charging system in accordance with another embodiment. As shown in FIG. 10, EV charging system 1000 is a multi-port modular power converter that uses a modular transformer. As in FIG. 9, a single phase is illustrated for ease of discussion.

Incoming grid power is received, after coupling through a surge voltage blocker circuit as described herein, at a given grid voltage via input nodes 1005*a*, 1005*b*. The incoming voltage is provided to a plurality of input stages, each of which may include multiple H-bridge converters. More specifically, a plurality of power converter stages $1010_1$-$1010_n$ are shown. Each stage 1010 may include a grid-side converter $1012_{1-n}$ (shown as an AC-DC converter) and a DC-AC converter $1014_1$-$1014_n$ of a given DC-DC converter $1015_1$-$1015_n$. Via independent transformers of DC-DC converters 1015, a resulting electrically isolated DC voltage is provided to an AC-DC converter $1032_1$-$1032_n$ and thereafter to a load-side converter $1034_1$-$1034_n$. In one embodiment, each load-side converter $1034_1$-$1034_n$ may provide a voltage to the load, e.g., connected electric vehicles. However here note that potentially different amounts of load-side converters 1034 may be cascaded to provide a given DC voltage to a load (e.g., EV charging station). As one example, a first set of load-side converters $1034_1$-$1034_j$ may provide a first charging voltage of approximately 1500 volts via output nodes 1045*a,b*. And a second set of load-side converters $1034_{j+1}$-$1034_n$ may provide a second charging voltage of approximately 1000 volts via output nodes 1045*c,d*.

Figure 11:
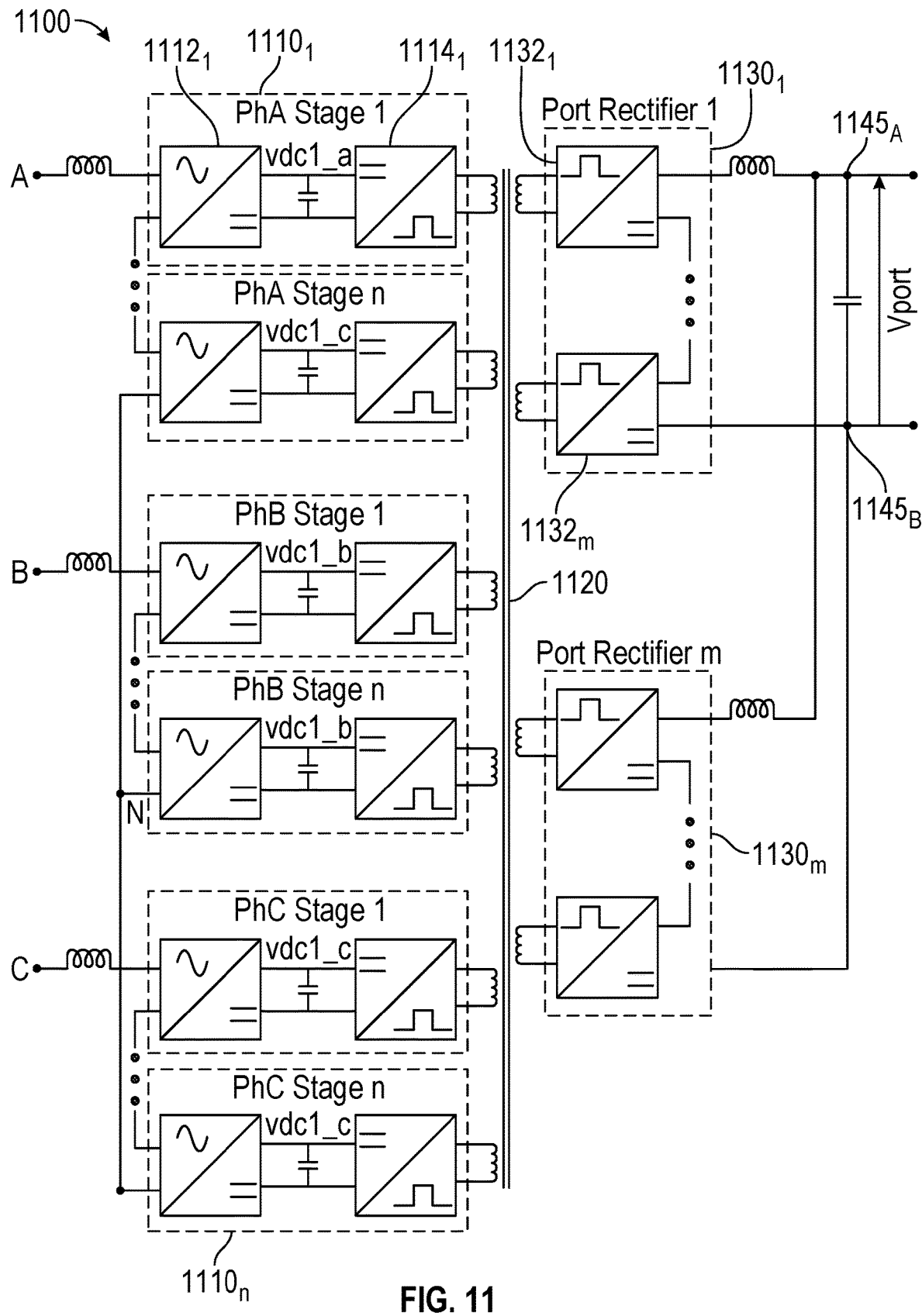
FIG. 11 is a block diagram of an EV charging system in accordance with another embodiment.

Referring now to FIG. 11, shown is a block diagram of an EV charging system in accordance with another embodiment. As shown in FIG. 11, EV charging system 1100 may be implemented similarly to EV charging system 900 of FIG. 9 (and thus reference numerals generally refer to the same or similar components, albeit of the "1100" series in place of the "900" series of FIG. 9). On an input side of a multi-winding transformer 1120, each input phase includes n power stages 11101-*n* that are connected in series. Each power stage 1110 includes an AC/DC converter 1112, DC bus, and a DC-to-high frequency converter 1114 (also referred to as a "high frequency converter").

In this implementation, output stages are implemented as port rectifiers $1130_1$-$1130_m$. As shown, each port rectifier 1130 includes at least one AC-DC converter (e.g., AC-DC converters $1132_1$-$1132_m$). As illustrated in FIG. 11, multiple port rectifiers 1130 can couple in parallel to provide higher a charging current at output nodes $1145_{A,B}$. In other cases, port rectifiers 1130 may be coupled in series to provide a higher charging voltage.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   a surge voltage blocker circuit to couple between a distribution grid network and a grid-side power converter of a power conversion system, the surge voltage blocker circuit comprising:
   a plurality of series-coupled AC switch circuits, each of the plurality of series-coupled AC switch circuits comprising:
   a bidirectional switch formed of a first power transistor and a second power transistor, the first power transistor having a first terminal coupled to a first terminal of the second power transistor; and
   a transient voltage suppression device coupled in parallel with the bidirectional switch, wherein the surge voltage blocker circuit is to provide lightning protection to the grid-side power converter, wherein the grid-side power converter is coupled between the surge voltage blocker circuit and a high frequency transformer of the power conversion system, the grid-side power converter coupled to the distribution grid network without an intervening low frequency transformer; and a controller coupled to the surge voltage blocker circuit to control gate circuitry of the bidirectional switch of at least two of the plurality of series-coupled AC switch circuits, wherein in response to at least one of a voltage surge at an input of the surge voltage blocker circuit or a detection of an error in the power conversion system, the controller is to disable the bidirectional switch of the at least two of the plurality of series-coupled AC switches, and in response to the voltage surge, the transient voltage suppression device is to pass at least a portion of a surge current to the power conversion system.

2. The apparatus of claim 1, wherein the at least two of the plurality of series-coupled AC switch circuits further comprise a snubber circuit in parallel with the bidirectional switch.

3. The apparatus of claim 1, wherein the at least two of the plurality of series-coupled AC switch circuits further comprise a first snubber circuit in parallel with the first power transistor and a second snubber circuit in parallel with the second power transistor.

4. The apparatus of claim 1, wherein the surge current is to charge a DC bus of the power conversion system.

5. The apparatus of claim 1, wherein the controller is to control switch circuitry of the grid-side power converter to cause a DC bus of the grid-side power converter to be charged in response to the voltage surge.

6. The apparatus of claim 5, wherein in response to a voltage of the DC bus that exceeds a threshold, the controller is to control the switch circuitry to cause the surge current to bypass the DC bus and flow to a ground node.

7. The apparatus of claim 1, further comprising:
a first voltage sensor coupled to the input of the surge voltage blocker circuit; and
a second voltage sensor coupled to an output of the surge voltage blocker circuit.

8. The apparatus of claim 7, wherein the first voltage sensor is to provide a sensed grid-side voltage to the controller, and the second voltage sensor is to provide a sensed converter-side voltage to the controller, wherein the controller is to control the surge voltage blocker circuit based at least in part on at least one of the sensed grid-side voltage or the sensed converter-side voltage.

9. The apparatus of claim 1, further comprising a reactor coupled between the distribution grid network and the surge voltage blocker circuit.

10. The apparatus of claim 1, further comprising a neutral inductor coupled between a neutral node and a ground node, wherein the grid-side power converter is coupled to the neutral node.

11. A method comprising:
in response to detecting that a voltage at a grid-side input of an electric vehicle (EV) charger exceeds a first threshold, disabling, via a controller, a plurality of switches of a solid state circuit breaker, to cause a surge current to flow through a plurality of transient voltage suppression devices of the solid state circuit breaker;
controlling a grid-side power converter of the EV charger to cause the surge current to charge a DC bus of the grid-side power converter, wherein the grid-side power converter is coupled to a distribution grid network without an intervening low frequency transformer;
disabling at least one of the grid-side power converter and a secondary-side power converter of the EV charger in response to the detection of the voltage exceeding the first threshold, the secondary-side power converter coupled between a high frequency transformer and one or more EV charging dispensers, the grid-side power converter coupled between the solid state circuit breaker and the high frequency transformer; and
in response to detecting that the voltage of the grid-side input has fallen below the first threshold, enabling the plurality of switches of the solid state circuit breaker and controlling the grid-side power converter to be in a normal operation mode.

12. The method of claim 11, further comprising in response to detecting that a voltage of the DC bus exceeds a second threshold, controlling the grid-side power converter to enter a zero state to cause the surge current to bypass the DC bus.

13. The method of claim 12, further comprising:
controlling a first switch and a third switch of the grid-side power converter to cause the surge current to flow through the DC bus, wherein a first diode is coupled in antiparallel with the first switch and a third diode is coupled in antiparallel with the third switch; and
controlling the first switch and a second switch of the grid-side power converter to cause the surge current to bypass the DC bus.

14. The method of claim 11, further comprising controlling the plurality of switches of the solid state circuit breaker to be closed in the normal operation mode.

15. An electric vehicle (EV) charging system comprising:
a circuit coupled between a distribution grid network and a plurality of grid-side converters, the circuit comprising:
a plurality of series-coupled AC switch circuits, each of the plurality of series-coupled AC switch circuits comprising:
a bidirectional switch formed of a first power transistor and a second power transistor, the first power transistor having a first terminal coupled to a first terminal of the second power transistor; and
a transient voltage suppression device coupled in parallel with the bidirectional switch, wherein the plurality of grid-side converters are coupled to the distribution grid network without an intervening low frequency transformer;
the plurality of grid-side converters to receive grid power at a grid voltage and convert the grid voltage to a plurality of DC voltages and a plurality of high frequency converters to convert the plurality of DC voltages to a plurality of first high frequency AC voltages;
a high frequency transformer having:
a plurality of primary windings each coupled to one of the plurality of high frequency converters to receive a corresponding one of the plurality of first high frequency AC voltages; and
a plurality of secondary windings each to output one of a plurality of second high frequency AC voltages;
a plurality of port rectifiers coupled to the plurality of secondary windings, each of the plurality of port rectifiers comprising an AC-DC converter to receive one of the plurality of second high frequency AC voltages and convert the one second high frequency AC voltage to a DC voltage, wherein at least two of the plurality of port rectifiers are coupled together to provide at least one of a charging current or a charging voltage to at least one dispenser, wherein the at least one dispenser is to provide the at least one of the charging current or the charging voltage to at least one EV; and a controller coupled to the circuit, wherein in response to at least one of a voltage surge at an input of the circuit or a detection of an error in the EV charging system, the controller is to disable the bidirectional switch of at least two of the plurality of series-coupled AC switches.

16. The EV charging system of claim 15, wherein the at least two of the plurality of series-coupled AC switch circuits further comprise at least one snubber circuit in parallel with the bidirectional switch.

17. EV charging system of claim 15, wherein in response to the voltage surge, the transient voltage suppression device is to pass at least a portion of a surge current to the plurality of grid-side converters, wherein the surge current is to charge a DC bus of the plurality of grid-side converters.

* * * * *